(12) United States Patent
Clarke et al.

(10) Patent No.: US 7,194,383 B2
(45) Date of Patent: Mar. 20, 2007

(54) VIBRATION ANALYSIS SYSTEM AND METHOD FOR A MACHINE

(75) Inventors: Burton R. Clarke, Cuba, IL (US); Ryan P. Allgaier, East Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 11/197,707

(22) Filed: Aug. 4, 2005

(65) Prior Publication Data

US 2006/0122809 A1 Jun. 8, 2006

Related U.S. Application Data

(60) Provisional application No. 60/633,481, filed on Dec. 6, 2004.

(51) Int. Cl.
G06F 11/30 (2006.01)
(52) U.S. Cl. ............................... 702/183; 702/185
(58) Field of Classification Search ............ 702/179, 702/180, 181, 182, 183, 185, 186, 188; 706/2, 706/15, 16, 20; 73/570, 571, 649
See application file for complete search history.

(56) References Cited

U.S. PATENT DOCUMENTS

| | | | |
|---|---|---|---|
| 5,333,240 A | 7/1994 | Matsumoto et al. | |
| 5,566,092 A * | 10/1996 | Wang et al. | 702/185 |
| 5,602,761 A * | 2/1997 | Spoerre et al. | 702/179 |
| 5,633,800 A | 5/1997 | Bankert et al. | |
| 6,240,343 B1 | 5/2001 | Sarangapani et al. | |
| 6,301,572 B1 | 10/2001 | Harrison | |
| 2003/0067277 A1 | 4/2003 | Parlos et al. | |

* cited by examiner

*Primary Examiner*—Bryan Bui
(74) *Attorney, Agent, or Firm*—Steve D. Lundquist

(57) ABSTRACT

A system and method for detecting and analyzing anomalies in a machine during operation. The system and method includes at least one sensor configured to detect characteristics of the machine indicative of machine vibration, at least one other sensor configured to detect characteristics of the machine indicative of other than machine vibration, a plurality of neural networks to receive input data, at least one neural network receiving vibration data from the at least one sensor, and at least one other neural network receiving non-vibration data from the at least one other sensor, and an expert system to receive output data from the neural networks and responsively analyze machine operation for anomalies.

27 Claims, 3 Drawing Sheets

Fig_2_ # VIBRATION ANALYSIS SYSTEM AND METHOD FOR A MACHINE This application claims benefit under 35 U.S.C. § 119(e) of U.S. Provisional Application No. 60/633,481, entitled "Vibration Analysis System and Method for a Machine", filed Dec. 6, 2004.

TECHNICAL FIELD

This invention relates generally to a system and method for analyzing vibration related data for a machine and, more particularly, to a system and method for testing and analyzing vibration relevant data for a rotating machine using traditional vibration analysis techniques in cooperation with artificial intelligence.

BACKGROUND

Rotating machinery is used in many applications. For example, machines such as mobile machines, e.g., on and off road vehicles, construction machines, earthworking machines, and the like, employ principles of rotation to function. Engines, motors, drive trains, ground engaging components such as wheels or tracks, and the like rotate to enable the machines to perform work tasks.

The efficiency and life expectancy of rotating machinery may be analyzed and determined by resort to a study of vibrations present in the machine components. Friction forces between moving parts, compounded by irregularities in component tolerances, serve to cause vibrations in the machines. An analysis of the vibrations may aid in determining, in real time and non-intrusively, the health of the machines, even to the point of predicting component life and potential breakdowns.

Vibration analysis, including related concepts of sound and ultrasonic analysis, has long been of interest in monitoring and diagnosing machine health. However, vibration analysis techniques have typically proven to be lacking by either providing questionable results or providing data that cannot be readily interpreted and understood.

Efforts have been made to use artificial intelligence techniques to test and analyze vibration of machines. For example, U.S. Pat. Nos. 5,566,092, 5,566,273, 5,602,761, 5,854,993, 6,236,950 and 6,539,319, all assigned to the present assignee, disclose variations in techniques for using neural networks to perform testing and analysis of machines, particularly with respect to vibration characteristics of the machines. Although the techniques embodied in the above patents have resulted in some degree of success, it is desired that further techniques be developed which offer greater reliability, robustness and precision in testing and analysis.

The present invention is directed to overcoming one or more of the problems as set forth above.

SUMMARY OF THE INVENTION

In one aspect of the present invention a system for detecting and analyzing anomalies in a machine during operation is disclosed. The system includes at least one sensor configured to detect characteristics of the machine indicative of machine vibration, at least one other sensor configured to detect characteristics of the machine indicative of other than machine vibration, a plurality of neural networks to receive input data, at least one neural network receiving vibration data from the at least one sensor, and at least one other neural network receiving non-vibration data from the at least one other sensor, and an expert system to receive output data from the neural networks and responsively analyze machine operation for anomalies.

In another aspect of the present invention a method for detecting and analyzing anomalies in a machine during operation is disclosed. The method includes receiving input data from a plurality of sensors, at least one sensor configured to detect characteristics of the machine indicative of machine vibration, and at least one other sensor configured to detect characteristics of the machine indicative of other than machine vibration, delivering the input data to a plurality of neural networks, at least one neural network receiving vibration data, and at least one other neural network receiving non-vibration data, the at least one other neural network for comparing an influence of the non-vibration data on the vibration data, delivering output data from the plurality of neural networks to an expert system, and analyzing the output data for anomalies associated with machine operation.

In yet another aspect of the present invention a system for detecting and analyzing vibrations in a machine is disclosed. The system includes a test station operable to receive input data from a plurality of sensors, at least one sensor configured to detect characteristics of the machine indicative of machine vibration, and at least one other sensor configured to detect characteristics of the machine indicative of other than machine vibration, a hub containing a plurality of neural networks, at least one neural network operable to receive and analyze vibration data, and at least one other neural network operable to receive and analyze non-vibration data, the hub further containing an expert system operable to receive analyzed data from the plurality of neural networks and responsively analyze vibration characteristics of the machine, and a communications link operable to transmit data from the test station to the hub.

DETAILED DESCRIPTION

Figure 1:
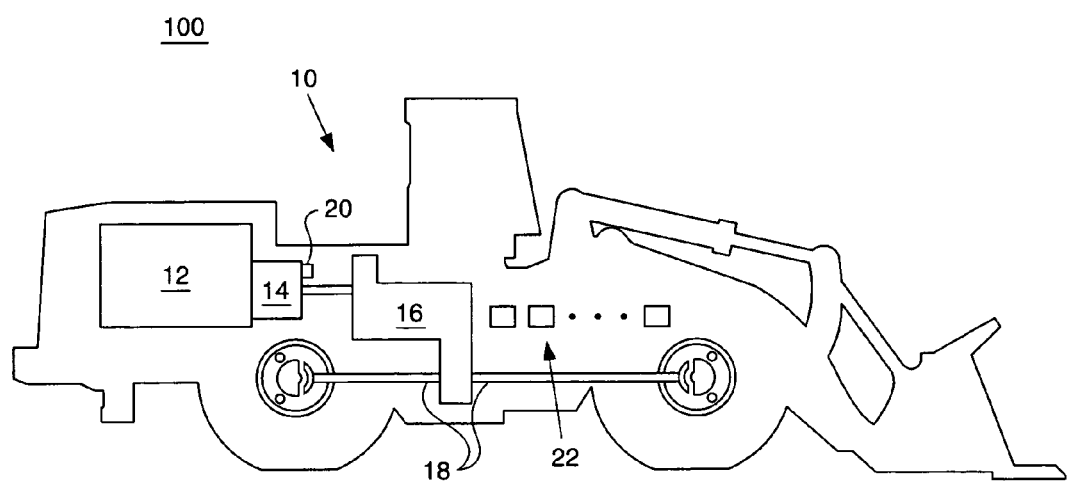
FIG. 1 is a diagrammatic illustration of a machine that may be used with the present invention.

Referring to the drawings in general, a system 100 and method for detecting and analyzing anomalies in a machine 10 during operation is shown. Anomalies may refer to vibration related characteristics of the machine 10, in particular to vibration related characteristics of rotating components of the machine 10.

Referring to FIG. 1 in particular, a machine 10 is embodied as a wheel loader, typically used for earthworking and construction purposes. The wheel loader depiction is merely for exemplary purposes, in that machines of a variety of types, mobile and stationary, may be used with the present invention. For example, other types of wheeled machines and vehicles, tracked machines, power generators, machines for manufacturing, assembly, and storage, and various other types of machines, may all benefit from use of the present invention.

The exemplary machine 10 of FIG. 1 may include an engine 12, a transmission 14, a transfer unit 16 of some type, e.g., a transfer case, and a drive train 18, all of which are well understood in the art. A common feature of the above listed components of the machine 10 is that all embody rotating movement of component parts, that may be prone to vibration within or outside of acceptable tolerances.

At least one vibration sensor 20 may be used to sense, either directly or through derivation, vibrations in the machine 10. Vibration sensors 20 may include such devices as rotational speed sensors, accelerometers, and the like, and may be connected at various desired locations on the machine 10 to sense parameters indicative of vibration.

At least one other, non-vibration sensor 22 may be used to detect, either directly or indirectly, characteristics associated with the machine 10 that are not vibration related. Examples of non-vibration sensors 22 may include temperature sensors, humidity sensors, barometric pressure sensors, fluid level sensors, and the like.

Figure 2:
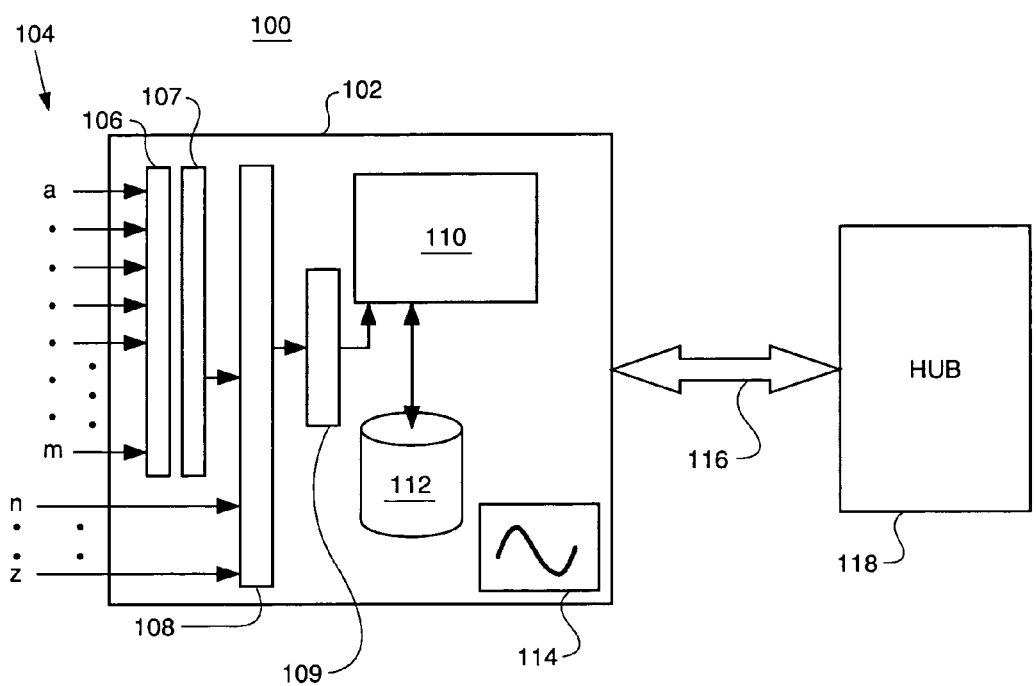
FIG. 2 is a block diagram depicting an aspect of the present invention.

Referring to FIG. 2, a block diagram illustrating an aspect of the system 100 is shown. The system 100 is depicted as having a remote test station 102 for on-site testing of the machine 10, and a processing hub 118 that may be located at a central point away from the test station 102. For example, there may be many remote test stations 102 located at sites in which machines are also located, and a single processing hub 118 located at a central station away from the machine sites. Although the present disclosure describes the exemplary situation in which the test station 102 and the hub 118 are at separate locations, it is conceivable that the test station 102 and the hub 118 may be located at one site, perhaps even housed as one unit.

The test station 102 may include a plurality of sensed inputs 104, for example from a variety of vibration and non-vibration sensors 20,22. The sensed inputs 104 may be input to a signal conditioner 106. The signal conditioner 106 may be used to perform functions such as providing proper biasing currents. The conditioned signals may then be routed through analog filters 107 for anti-aliasing. The signals may then be delivered to an I/O connector 108, and then to an A/D converter card 109 for conversion from analog to digital. Sensed inputs 104a–m represent signals that are processed by the above steps. Alternatively, signals, as depicted by sensed inputs 104n–z, may not require the above conditioning and filtering and may be delivered directly to the I/O connector 108.

A processor 110 may receive the conditioned data signals and perform additional processing. For example, a memory 112 may be accessed to store and retrieve data. The processor 110 may also prepare the data for delivery to the hub 118, e.g., by selecting certain data, categorizing data, tabulating and partially analyzing raw data, and the like.

The remote test station 102 is powered by a power supply 114, which may be an uninterruptible power supply (UPS) to protect the equipment and the received and compiled data from corruption caused by power interruptions.

A communications link 116 provides communications between the test station 102 and the hub 118. The communications link 116 may be wired or wireless, depending on the overall system configuration and needs. Preferably, communications may be made by way of an Internet protocol for web access. However, other methods of communication may be used. For example, the communications link 116 may be wireless such as radio, microwave, or satellite, or may be wired such as via telephone line, coaxial cable, power transmission lines, and the like. In addition, the communications link 116 may be hard wired by way of dedicated wiring connections, or the test station 102 and the hub 118 may be connected together as one integrated unit. Associated transmit and receive equipment (not shown) is used to enable communications over the communications link 116. By whatever medium used for communicating, the communications link 116 may be secured from access, such as by an encrypted Internet protocol, for example.

The processing hub 118 is enabled to receive data from one or more test stations 102, process and analyze the data, and deliver the results of the analysis to the test stations 102, or to other designated locations, e.g., to other sites which may be designated to receive out of tolerance or alarm condition messages by way of text messaging or email. Details of operation of the hub 118 may best be described with reference to FIG. 3. The hub 118 may represent software within a computer. In this embodiment, the blocks in FIG. 3 represent various software functions.

Figure 3:
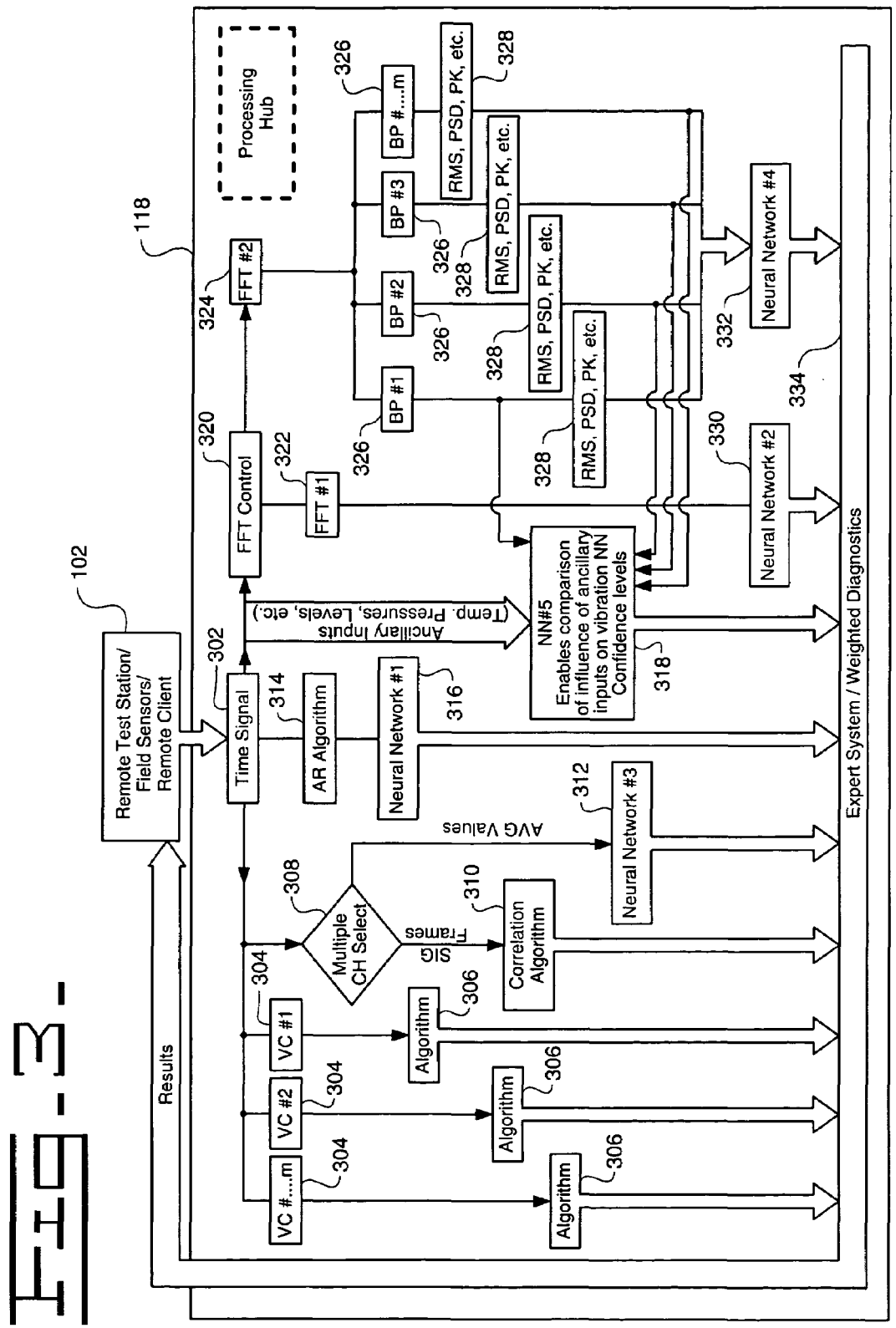
FIG. 3 is a detailed block diagram of a processing hub suited for use with the system of FIG. 2.

In FIG. 3, a block indicated as time signal 302 represents the test signal that is delivered to the hub 118 by way of the communications link 116. The time signal 302 is processed prior to delivery by the test station 102 and may be analog to digital converted, encrypted, and delivered as a compacted test message, for example in Internet protocol. The time signal 302 may have many channels and many test steps for each channel. For example, the time signal 302 may have channels representative of each sensed signal being analyzed, and each channel may have test steps for multiple operating conditions of the machine 10. More specifically, the machine 10 may be a transmission, the channels may represent signals received from a multitude of sensors which are configured to sense a corresponding multitude of characteristics of the transmission, e.g., vibrations, temperature, pressure, environmental conditions, and the like, and the test steps may be indicative of various operating modes of the transmission, e.g., first gear forward, second gear forward, and the like.

At least one virtual channel 304 is set up to receive the time signals 302 for delivery to at least one algorithm 306. The virtual channels 304 may be compared in function to signal splitters, thus providing distinct routes for the time signals 302 to be sent. However, the virtual channels 304 have no physical connection to the world outside of the hub 118. The time signals 302 may pass unaltered through each virtual channel 304 or, alternatively, one or more virtual channels 304 may be used to select desired components of the time signals 302. The algorithms 306 may be used to process the time signals 302 for analysis using techniques such as correlation, co-variance, wavelet analysis, and the like.

A multiple channel selector 308 provides for selection of multiple channels for processing and analysis. The multiple channel selector 308 may provide more than one channel of the time signal 302 to an algorithm, such as a correlation algorithm 310, to analyze the channels, in particular the results of interactions between the channels. For example, a channel indicative of a vibration signal of a sensor located on a component under test may be analyzed with consideration given to a channel indicative of a vibration signal of a sensor located elsewhere on the machine 10.

The multiple channel selector 308 may also process the time signals 302, e.g., for each of multiple channels, to prepare the signals for a neural network, such as neural network number three 312. In particular, the multiple channel selector 308 may average values, e.g., peak amplitude or power, of the signals to provide points to neural network number three 312.

The time signals 302 may also be delivered to an autoregression (AR) algorithm 314 for conversion to the frequency domain. The AR algorithm 314, as is well known in the art, is a computationally efficient method for transferring signals from the time domain to the frequency domain. The transferred signals may then be delivered to a neural network, such as neural network number one 316 for analysis.

Various channels of the time signal 302 may represent ancillary sensors, i.e., signals from non-vibration sensors 22. These ancillary sensor signals may be sent to a compensatory neural network, i.e., neural network number five 318, for comparison of the influence of the ancillary characteristics on the analysis of vibration related signals. For example, ancillary characteristics such as temperature, pressure, fluid levels, ambient conditions, and the like, have an effect on machine vibrations. As such, an analysis of vibration signals may be made at a higher confidence level if these ancillary characteristics are taken into account.

The time signals 302 may also be sent to an FFT (Fast Fourier Transform) control 320, which may provide options such as the use of a truncated FFT, a decimated time waveform FFT, and the like. FFTs, such as FFT number one 322 and FFT number two 324, convert the time domain signals to the frequency domain and may or may not condense the number of frequency domain points to simplify the work of the neural networks.

The use of an FFT algorithm allows for processing of a time domain signal to produce a frequency domain signal which represents all frequency components present in the provided time-domain signal. Given the large number of data points in the frequency spectrum, it may take a significant amount of time to determine which frequencies are significant, and to determine what a normal level for these frequencies should be. The present invention may use an autostencil algorithm to automatically create a set of spectral divisions, based on the given frequency domain signal. Based on the dimensions of the division, new data signals may be passed through the divisions to perform diagnostic functions upon their content, such as the absolute maximum value of any frequency component contained therein, or the power, e.g., RMS value, of the data contained within the division.

A preferred algorithm may work by identifying key component frequency elements in the signal, creating a spectral division around the signal, scaling the height of the division as appropriate, and repeating until a series of divisions are created. The algorithm may first identify the highest amplitude frequency component that is not already part of an existing spectral division. The algorithm may then use a predefined or user configurable transfer function to create a spectral division around this frequency component. The transfer function serves to identify the width of the spectral division. The transfer function is typically an exponential curve. As variations in environmental variables, e.g., RPM, temperature, humidity, and the like, may cause a shift in frequencies, higher frequency components will typically be more greatly affected than lower frequency components. The exponential transfer function may serve to widen those spectral divisions at upper frequencies so that their content remains relatively stable. A similar exponential transfer function may exist to scale the height, e.g., thresholds, of the spectral division. This transfer function may then serve to scale down the thresholds of any spectral divisions present in higher frequency ranges as it takes a much higher force at higher frequencies to cause a significant change in amplitude of a frequency component than it would take at lower frequencies.

The process of identifying frequency components may repeat until certain criteria have been met. In a first embodiment, a fixed number of divisions, i.e., N number, may be requested, to identify the top N major components of the signal. In a second embodiment, the algorithm may run with the number of divisions N set to infinity to saturate the signal with divisions, thus ensuring that substantially all of the signal is covered by at least one division. A third embodiment may involve calculating a signal-to-noise ratio and a total power in the signal, and then a process begins of identifying divisions until all non-noise power in the signal is contained within defined spectral divisions.

The FFT points from FFT number one may be applied directly to a neural network such as neural network number two for vibration analysis.

The FFT points from FFT number two 324 may then be sent through a series of band pass filters (BPF) 326 configured in parallel so that the frequency domain may be split into bands of frequency packets. Each packet then may undergo further processing by way of frequency packet processors 328. For example, a root mean square (RMS) value of each packet may be determined or a peak value (PK) of each packet may be determined. Alternatively, a power spectral density (PSD) or some other such value may be determined.

The points from the frequency packet processors 328 may then be applied to a neural network such as neural network number four 332 to analyze vibration characteristics of the machine 10 under test. Furthermore, the points may, in addition or alternatively, be applied to neural network number five 318, i.e., the compensatory neural network, for inclusion of the influence of ancillary characteristics in the vibration analysis of the machine 10 under test. Preferably, the results of the compensatory neural network will have a higher confidence level due to the inclusion of factors that may have an effect on machine vibrations, that are not considered by typical vibration analysis techniques.

Each of the neural networks and algorithms used may be assigned an adjustable weighting factor during initial setup of the hub 118, and during subsequent sessions in which the hub 118 is fine tuned for optimal performance. The process for setting up the hub 118 may employ the use of wizards which prompt for certain inputs, such as number and types of neural networks, BPF specifics, virtual channels and algorithms to be used, and the like. The resultant hub configuration may thus be customized for specific vibration analysis situations, and also may be altered periodically as desired. The hub 118 may be based on software which provides for drag and drop user configurability. For example, various selectable features such as BPFs, algorithms, neural networks, and the like, may be selected by dragging icons representative of such features to a portion of a display and dropping the icons to select them. By this technique, any desired number of features may be chosen. The selection of features may be made for each test step of each channel in the time signal 302.

The above described algorithm, and other algorithms that may be used as well, may be used to identify a series of inputs that are applicable to a neural network. Part of the configuration process involves taking collected data, identifying it as a normal pattern, and training this normal pattern to all the neural networks contained within the processing hub 118. When a new test plan is set up, or an existing test plan is updated or modified, each neural network present must potentially be reconfigured based on the most recent data collected. As a part of this process, each neural network present must be re-initialized, created, and trained. Subsequently, the normal pattern for each neural network must be identified, and each neural network must be trained with a new pattern.

The use of wizards may be used to fully automate this process, thus eliminating operator error, and significantly reducing the time required to get the processing hub 118 into operation. The wizards may identify each neural network present, regardless of the previous state of any neural network. Furthermore, the use of wizards may allow for test identification of normal samples, i.e., a sample being the full result of one test performed by the processing hub 118. This may include the identification of multiple samples, having patterns which may then be combined to form a single input pattern. Once an input pattern is identified for each unique neural network, the network is blanked if necessary, initialized, and then trained to the normal pattern identified by the above procedure. The process may then be repeated for each neural network present, regardless of the size of the pattern, e.g., number of points.

An expert system 334 receives the weighted outputs from the chosen neural networks and algorithms, and responsively sums the weights for a final vibration analysis of the machine 10. If desired, conditioned packets from the BPFs 326, e.g., RMS conditioned, may be sent directly to the expert system 334 to help establish confidence in the neural networks, in particular neural network number four 332, and neural network number five 318.

INDUSTRIAL APPLICABILITY

The system 100 may be selected to operate in any one of several modes. For example, a first mode may be chosen in which the system 100 monitors the results of all configured test plan parameters, and outputs an alarm if a threshold of any selected parameter is exceeded. Notifications may be sent to any desired location by any desired means.

A second mode may include the features of the above described first mode, and further include alarm functions based on the outputs of any neural networks if preset confidence levels are exceeded.

A third mode may include features of the first and second modes, and may further include the ability for a test engineer to elect to have the system 100 make an intelligent prognosis based on the weighted results of any selected parameters, as well as any of the neural network confidence levels. The results, based on a combination of weights in any desired category, may be provided to an operator of the machine 10, a test engineer at the hub 118, a database for recordation, another specified location, or any combination thereof.

The use of the above described techniques and components in the hub 118 allows for greater confidence levels in the results and also enables vibration analysis with the use of neural networks which have no need for past historical data to achieve a reasonable level of reliability certainty.

Other aspects can be obtained from a study of the drawings, the disclosure, and the appended claims.

What is claimed is:

1. A system for detecting and analyzing anomalies in a machine during operation, comprising:
   at least one sensor configured to detect characteristics of the machine indicative of machine vibration;
   at least one other sensor configured to detect characteristics of the machine indicative of other than machine vibration;
   a plurality of neural networks to receive input data, at least one neural network receiving vibration data from the at least one sensor, and at least one other neural network receiving non-vibration data from the at least one other sensor, the at least one other neural network for comparing an influence of the non-vibration data on the vibration data; and
   an expert system to receive output data from the neural networks and responsively analyze machine operation for anomalies.

2. A system, as set forth in claim 1, wherein at least one of the plurality of neural networks includes a weighting factor.

3. A system, as set forth in claim 2, wherein the weighting factor is an adjustable weighting factor.

4. A system, as set forth in claim 1, further including an autoregression algorithm to receive input data in time domain and convert the input data to frequency domain.

5. A system, as set forth in claim 4, wherein at least one neural network receives the converted data.

6. A system, as set forth in claim 1, further including at least one Fast Fourier Transform to receive input data and convert the input data from time domain to frequency domain.

7. A system, as set forth in claim 6, wherein at least one neural network receives the converted data.

8. A system, as set forth in claim 6, further including a plurality of band pass filters to split the converted data into frequency packets of data.

9. A system, as set forth in claim 8, further including a corresponding plurality of processors to receive each of the frequency packets and responsively determine a value indicative of a feature of the packet of data.

10. A system, as set forth in claim 8, wherein at least one neural network receives the frequency packets of data.

11. A system, as set forth in claim 9, wherein at least one neural network receives the determined values.

12. A system, as set forth in claim 9, wherein the at least one other neural network receiving non-vibration data receives at least one of the frequency packets of data and the determined values.

13. A system, as set forth in claim 1, further including at least one virtual channel to deliver at least a portion of the input data to a corresponding one of at least one algorithm.

14. A system, as set forth in claim 1, further including a multiple channel selector to select desired channels of data from the input data, process the selected channels, and deliver the selected channels to a correlation algorithm for analysis of interaction between the channels.

15. A system, as set forth in claim 14, wherein at least one neural network receives at least one processed channel.

16. A method for detecting and analyzing anomalies in a machine during operation, comprising the steps of:
   receiving input data from a plurality of sensors, at least one sensor configured to detect characteristics of the machine indicative of machine vibration, and at least one other sensor configured to detect characteristics of the machine indicative of other than machine vibration;
   delivering the input data to a plurality of neural networks, at least one neural network receiving vibration data, and at least one other neural network receiving non-vibration data, the at least one other neural network for comparing an influence of the non-vibration data on the vibration data;
   delivering output data from the plurality of neural networks to an expert system; and
   analyzing the output data for anomalies associated with machine operation.

17. A method, as set forth in claim 16, wherein receiving input data from a plurality of sensors includes the step of converting at least a portion of the input data from analog data to digital data.

18. A method, as set forth in claim 16, wherein receiving input data from a plurality of sensors includes the steps of:

conditioning at least a portion of the input data for proper voltage and current levels;

filtering the conditioned data to provide anti-aliasing; and converting the filtered data from analog data to digital data.

19. A method, as set forth in claim 16, wherein delivering the input data to a plurality of neural networks includes the step of transmitting the input data to a hub containing a plurality of neural networks.

20. A method, as set forth in claim 16, wherein delivering output data from the plurality of neural networks includes the step of assigning a weighting factor to data from at least one neural network.

21. A method, as set forth in claim 16, wherein delivering the input data to a plurality of neural networks includes the steps of:

converting at least a portion of the input data from a time domain to a frequency domain; and delivering the frequency domain data to at least one neural network.

22. A method, as set forth in claim 21, wherein converting at least a portion of the input data from a time domain to a frequency domain includes the step of applying an autoregression algorithm to the input data.

23. A method, as set forth in claim 21, wherein converting at least a portion of the input data from a time domain to a frequency domain includes the step of applying a Fast Fourier Transform to the input data.

24. A method, as set forth in claim 23, wherein delivering the input data to a plurality of neural networks includes the steps of:

splitting the converted data into a plurality of frequency packets of data;

determining a value of each frequency packet of data indicative of a feature of the packet of data; and delivering at least one of the frequency packets and the values to a corresponding at least one neural network.

25. A method, as set forth in claim 16, wherein delivering the input data to a plurality of neural networks includes the steps of:

selecting desired channels of data from the input data;

analyzing interactions between the selected channels; and delivering the analyzed channels of data to at least one neural network.

26. A method, as set forth in claim 25, wherein analyzing interactions between selected channels includes the step of applying a correlation algorithm to the selected channels.

27. A system for detecting and analyzing vibrations in a machine, comprising:

a test station operable to receive input data from a plurality of sensors, at least one sensor configured to detect characteristics of the machine indicative of machine vibration, and at least one other sensor configured to detect characteristics of the machine indicative of other than machine vibration;

a hub containing a plurality of neural networks, at least one neural network operable to receive and analyze vibration data, and at least one other neural network operable to receive and analyze non-vibration data, the hub further containing an expert system operable to receive analyzed data from the plurality of neural networks and responsively analyze vibration characteristics of the machine; and a communications link operable to transmit data from the test station to the hub.

\* \* \* \* \*